Feb. 17, 1931.  S. BRINDLEY  1,793,356
ANIMAL TRAP
Filed Dec. 15, 1928   2 Sheets-Sheet 1

Stephen Brindley, INVENTOR

BY Victor J. Evans
ATTORNEY

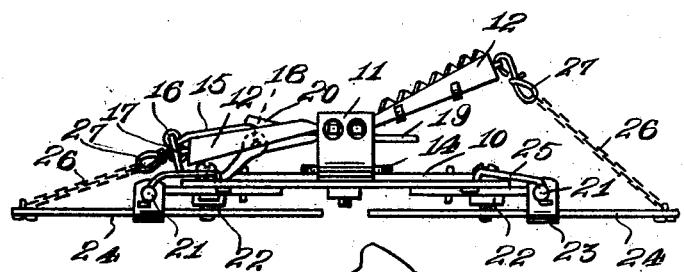
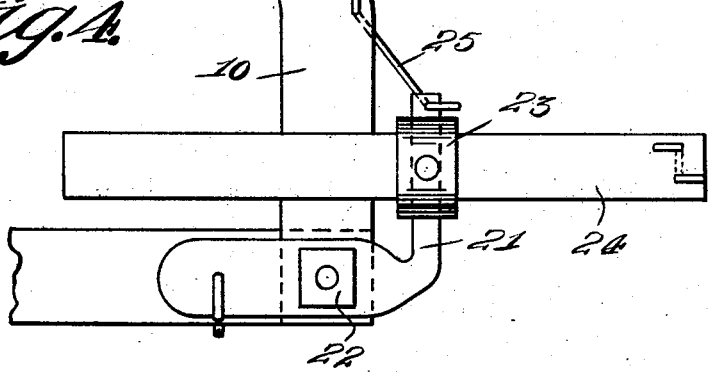
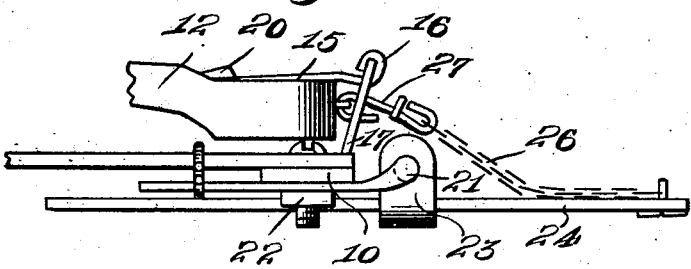

Patented Feb. 17, 1931

1,793,356

UNITED STATES PATENT OFFICE

STEPHEN BRINDLEY, OF CULLMAN, ALABAMA

ANIMAL TRAP

Application filed December 15, 1928. Serial No. 326,384.

This invention relates to improvements in animal traps, an object being to provide a trap which will insure gripping the leg of an animal relatively close to its body, so that the animal cannot escape by the jaws of the trap missing the leg, or by the trap gripping the leg so far down as to permit of the animal gnawing himself free.

In animal traps which include a pair of relatively movable spring actuated jaws released by the foot of the animal depressing a pan or trigger, frequently the action of the pan or trigger will force the foot of the animal upward so that the jaws will entirely miss the animal, or will engage the foot or toe so that the animal can gnaw himself free.

The present invention overcomes this serious disadvantage by providing means to elevate the trap simultaneous with the release of the jaws, so that when the jaws are released, the entire trap will move upward and the leg of the animal will be gripped close to its body.

With the above and other objects in view, the invention further includes the following novel features and details of construction, to be hereinafter more fully described, illustrated in the accompanying drawings and pointed out in the appended claims.

In the drawings:

Figure 3 is an edge view with the trap in the position shown in Figure 1.

Figure 4 is a fragmentary bottom plan view showing the means for pivotally mounting the elevating or lifting arms.

Figure 5 is an enlarged fragmentary edge view showing the manner of pivotally mounting the elevating or lifting arms, with the trap in set position.

Figure 1:
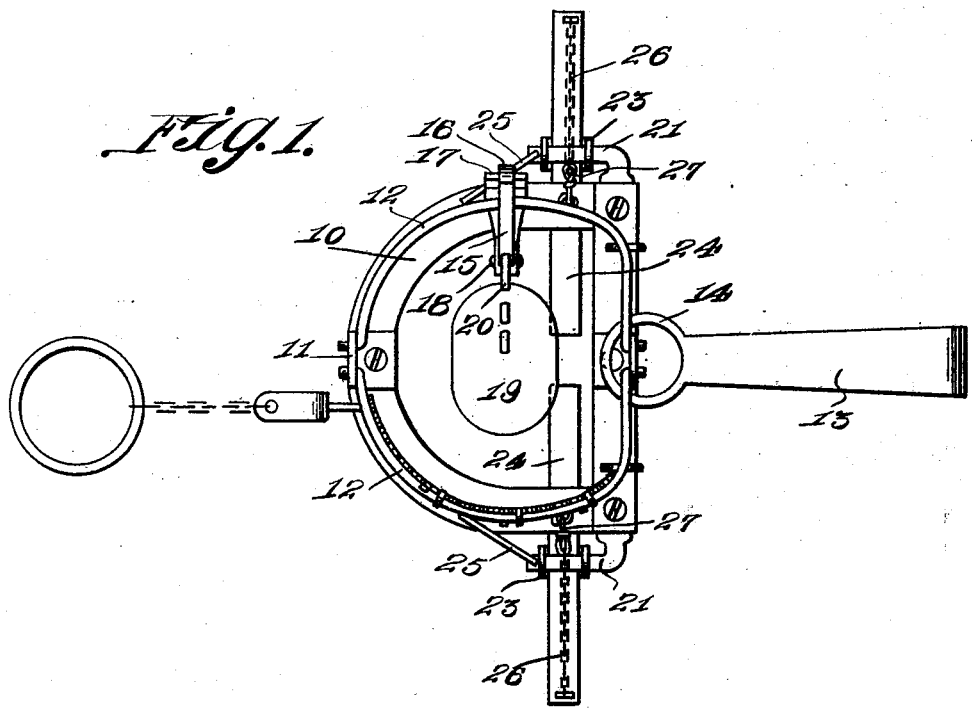
Figure 1 is a plan view of an animal trap constructed in accordance with the invention and arranged in "set" position.

Referring to the drawings in detail wherein like characters of reference denote corresponding parts, the reference character 10 indicates the frame of the trap which may be of any suitable size or shape and upon which is pivotally mounted as shown at 11 a pair of relatively movable jaws 12. These jaws are closed and held in closed position by means of a spring 13, the latter being of the ordinary double arm type and having eyes 14, one of which slides upon the jaws 12 when the latter are released so as to close and hold the jaws in closed position, as is usual in traps of this type.

The jaws are held in open position by means of a latch 15 which is pivotally mounted as shown at 16. For this purpose a bracket 17 is secured to the frame 10 and pivotally mounted at one end of this bracket as shown at 18 is a pan or trigger 19. This pan or trigger carries a finger 20 which is adapted to engage the latch 15 when the latter is engaged over one of the jaws 12 to hold the jaws in open position.

When an animal presses his foot upon the pan or trigger 19, the latter will be depressed to release the latch 15 so that the spring will act to snap the jaws 12 to closed position to engage the leg of the animal.

Frequently in traps of this character, the action of the pan or trigger 19 will force the animal's leg outward from between the jaws so that the animal will escape, or, it will catch the foot or toe of the animal and the latter may gnaw himself free.

The present invention provides means for overcoming this difficulty by raising the trap upward simultaneous with the release of the jaws. For this purpose the frame 10 is provided upon opposite sides with trunnions 21 which are secured to the frame in any suitable manner, such as indicated at 22. Pivotally mounted upon these trunnions through the medium of a strap 23 are arms 24, the straps being secured to the arms intermediate their ends. Relatively thin connecting rods 25 have one of their ends connected to the trunnions 21 and their opposite ends connected to the frame so as to prevent the straps from sliding off the ends of the trunnions. Chains 26 have one of their ends connected to one end of the arms 24 and their other ends connected to adjacent jaws 12 by means of hooks 27.

Figure 2:
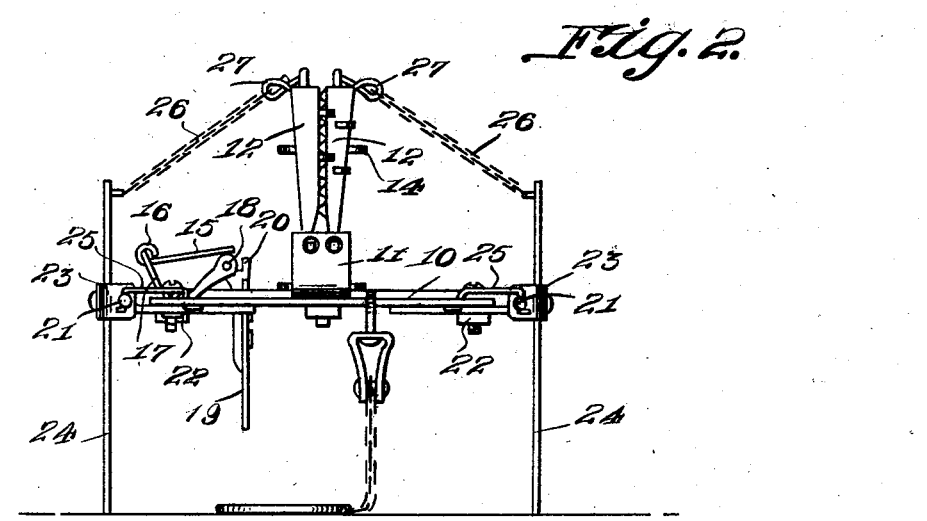
Figure 2 is an edge view showing the trap "sprung."

When the trap is set, the free ends of the arms 24 are extended inwardly beneath the trap frame so that the latter is positioned close to the ground. The jaws of the trap are set in the manner previously explained and when the trigger or pan 19 is depressed by the foot of the animal, the jaws will snap inward under the action of the spring 13 and due to the connection between the jaws and the lifting arms 24, the latter will be swung pivotally to an upright or vertical position so that the trap will be bodily raised as shown in Figure 2 of the drawings. The jaws will thus grip the leg of the animal close to its body so that the animal cannot escape.

The invention is susceptible of various changes in its form, proportions and minor details of construction and the right is herein reserved to make such changes as properly fall within the scope of the appended claims.

Having described the invention what is claimed is:

1. In an animal trap, a frame adapted to lie close to the surface of the ground, a pair of relatively movable spring influenced jaws mounted substantially centrally thereon, means adapted to be engaged by the foot of an animal to hold the jaws in open position, pivotally mounted means spaced beyond the jaws to automatically elevate the trap when the jaw holding means is released, and flexible means connecting the jaws and elevating means to move the latter to an operative position when the jaws are closed.

2. In an animal trap, a frame adapted to lie close to the surface of the ground, a pair of relatively movable spring influenced jaws mounted thereon, means adapted to be engaged by the foot of an animal to hold the jaws in open position, arms pivotally connected intermediate their ends to said frame beyond the jaws and adapted to lie beneath the trap when the jaws are open, and flexible means connecting the ends of the arms with the jaws to move said arms pivotally and elevate the trap when the jaws are closed.

3. In an animal trap, a frame adapted to lie close to the surface of the ground, a pair of relatively movable spring influenced jaws mounted thereon, means adapted to be engaged by the foot of an animal to hold the jaws in open position, arms pivotally mounted intermediate their ends upon opposite sides of the trap beyond the jaws and disposed horizontally when the trap is set, and flexible means connecting the arms and jaws to actuate said arms and elevate the trap when the trap is sprung.

In testimony whereof I affix my signature.

STEPHEN BRINDLEY.